United States Patent
Teggatz et al.

(10) Patent No.: US 10,079,090 B2
(45) Date of Patent: Sep. 18, 2018

(54) MULTIPLE COIL DATA TRANSMISSION SYSTEM

(75) Inventors: Ross Teggatz, McKinney, TX (US); Wayne Chen, Plano, TX (US); Amer Atrash, Richardson, TX (US); Andrew Blaszczak, Richardson, TX (US); Jonathan Knight, Osaka (JP)

(73) Assignee: TRIUNE SYSTEMS, LLC, Plano, TX (US)

( * ) Notice: Subject to any disclaimer, the term of this patent is extended or adjusted under 35 U.S.C. 154(b) by 926 days.

(21) Appl. No.: 13/309,423

(22) Filed: Dec. 1, 2011

(65) Prior Publication Data

US 2012/0139358 A1 Jun. 7, 2012

Related U.S. Application Data

(60) Provisional application No. 61/418,501, filed on Dec. 1, 2010.

(51) Int. Cl.
| | |
|---|---|
| *H01F 38/14* | (2006.01) |
| *H02J 50/12* | (2016.01) |
| *H02J 50/90* | (2016.01) |
| *H04B 5/00* | (2006.01) |
| *H02J 5/00* | (2016.01) |

(52) U.S. Cl.
CPC ............. *H01F 38/14* (2013.01); *H02J 50/12* (2016.02); *H02J 50/90* (2016.02); *H04B 5/0031* (2013.01); *H04B 5/0037* (2013.01); *H04B 5/0087* (2013.01); *H04B 5/0093* (2013.01); *H02J 5/005* (2013.01)

(58) Field of Classification Search
USPC .................. 307/17, 104, 149, 151
See application file for complete search history.

(56) References Cited

U.S. PATENT DOCUMENTS

| | | | |
|---|---|---|---|
| 6,349,116 B1 * | 2/2002 | Hash ..................... | G01V 15/00 |
| | | | 375/258 |
| 7,215,924 B2 | 5/2007 | Palermo et al. | |
| 7,426,239 B2 | 9/2008 | Taghizadeh-Kaschani | |
| 7,808,127 B2 | 10/2010 | Teggatz et al. | |
| 7,827,334 B2 | 11/2010 | Teggatz et al. | |
| 7,859,911 B2 | 12/2010 | Teggatz et al. | |
| 7,982,492 B2 | 7/2011 | Atrash et al. | |
| 8,102,713 B2 | 1/2012 | Teggatz et al. | |
| 8,102,718 B2 | 1/2012 | Teggatz et al. | |
| 8,300,375 B2 | 10/2012 | Teggatz et al. | |

(Continued)

FOREIGN PATENT DOCUMENTS

| | | | |
|---|---|---|---|
| JP | 2004159456 A | * | 6/2004 |
| WO | 2015/195403 A2 | | 12/2015 |

(Continued)

*Primary Examiner* — Rexford Barnie
*Assistant Examiner* — Xuan Ly
(74) *Attorney, Agent, or Firm* — Jackson Walker LLP; Christopher J. Rourk

(57) ABSTRACT

Multiple coil systems and methods are disclosed in which transmitter and receiver inductors, or coils, are coupled in a configuration for wirelessly transferring data and/or power among them. In preferred implementations, the systems and methods are used for transmitting data using pairs of coupled coils. One preferred aspect of the invention is that the coils are not permanently affixed in physical proximity to one another, but can be moved and/or interchanged.

20 Claims, 2 Drawing Sheets

(56) References Cited

U.S. PATENT DOCUMENTS

| | | |
|---|---|---|
| 8,373,436 B2 | 2/2013 | Atrash et al. |
| 8,408,900 B2 | 4/2013 | Teggatz et al. |
| 8,441,866 B2 | 5/2013 | Teggatz et al. |
| 8,461,847 B2 | 6/2013 | Teggatz et al. |
| 8,552,336 B2 | 10/2013 | Blackall et al. |
| 8,583,037 B2 | 11/2013 | Atrash et al. |
| 8,584,961 B2 | 11/2013 | Teggatz et al. |
| 8,664,745 B2 | 3/2014 | Teggatz et al. |
| 8,687,385 B2 | 4/2014 | Teggatz et al. |
| 8,693,261 B2 | 4/2014 | Teggatz et al. |
| 8,704,450 B2 | 4/2014 | Chen et al. |
| 8,743,522 B2 | 6/2014 | Teggatz et al. |
| 8,768,455 B2 | 7/2014 | Teggatz et al. |
| 8,772,973 B2 * | 7/2014 | Kurs .............. H02J 5/005 307/104 |
| 8,896,318 B2 | 11/2014 | Teggatz et al. |
| 8,964,418 B2 | 2/2015 | Atrash et al. |
| 9,083,391 B2 | 7/2015 | Teggatz et al. |
| 9,089,029 B2 | 7/2015 | Teggatz et al. |
| 9,106,221 B2 | 8/2015 | Atrash et al. |
| 9,134,741 B2 | 9/2015 | Atrash et al. |
| 9,214,867 B2 | 12/2015 | Teggatz et al. |
| 9,225,199 B2 | 12/2015 | Teggatz et al. |
| 9,225,293 B2 | 12/2015 | Teggatz et al. |
| 9,231,400 B2 | 1/2016 | Chen et al. |
| 9,343,988 B2 | 5/2016 | Teggatz et al. |
| 9,354,268 B2 | 5/2016 | Teggatz et al. |
| 2010/0259217 A1 * | 10/2010 | Baarman .............. H02J 5/005 320/108 |
| 2010/0314947 A1 * | 12/2010 | Baarman .............. H02J 5/005 307/104 |
| 2011/0008527 A1 | 1/2011 | Teggatz et al. |
| 2011/0028103 A1 * | 2/2011 | Rofougaran .......... H01Q 1/2258 455/77 |
| 2011/0115303 A1 * | 5/2011 | Baarman .............. H02J 17/00 307/104 |
| 2011/0140653 A1 * | 6/2011 | Jung .................. H02J 7/025 320/108 |
| 2011/0248825 A1 * | 10/2011 | Hamel ................ H04Q 9/00 340/10.1 |
| 2012/0025752 A1 | 2/2012 | Teggatz et al. |
| 2012/0028845 A1 | 2/2012 | Teggatz et al. |
| 2012/0139357 A1 | 6/2012 | Teggatz et al. |
| 2012/0188673 A1 | 7/2012 | Teggatz et al. |
| 2012/0242164 A1 | 9/2012 | Teggatz et al. |
| 2012/0248893 A1 | 10/2012 | Teggatz et al. |
| 2012/0274838 A1 | 11/2012 | Teggatz et al. |
| 2013/0062967 A1 | 3/2013 | Teggatz et al. |
| 2013/0175982 A1 | 7/2013 | Teggatz et al. |
| 2013/0181724 A1 | 7/2013 | Teggatz et al. |
| 2013/0193771 A1 | 8/2013 | Teggatz |
| 2013/0224679 A1 | 8/2013 | Teggatz et al. |
| 2013/0241465 A1 | 9/2013 | Teggatz et al. |
| 2013/0257171 A1 | 10/2013 | Teggatz et al. |
| 2013/0257172 A1 | 10/2013 | Teggatz et al. |
| 2014/0062381 A1 | 3/2014 | Teggatz et al. |
| 2014/0225447 A1 | 8/2014 | Teggatz |
| 2014/0329720 A1 | 11/2014 | Teggatz et al. |
| 2015/0171758 A1 | 6/2015 | Atrash et al. |
| 2015/0256227 A1 | 9/2015 | Teggatz et al. |
| 2015/0318899 A1 | 11/2015 | Teggatz et al. |
| 2015/0326118 A1 | 11/2015 | Teggatz et al. |
| 2015/0341087 A1 | 11/2015 | Moore et al. |
| 2015/0372676 A1 | 12/2015 | Teggatz et al. |
| 2016/0004267 A1 | 1/2016 | Atrash et al. |
| 2016/0033979 A1 | 2/2016 | Teggatz et al. |
| 2016/0105115 A1 | 4/2016 | Teggatz et al. |
| 2016/0134099 A1 | 5/2016 | Teggatz et al. |
| 2016/0134191 A1 | 5/2016 | Teggatz et al. |

FOREIGN PATENT DOCUMENTS

| | | |
|---|---|---|
| WO | 2016/019137 A2 | 2/2016 |
| WO | 2016/019139 A1 | 2/2016 |

* cited by examiner

MULTIPLE COIL DATA TRANSMISSION SYSTEM

PRIORITY ENTITLEMENT

This application is entitled to priority based on Provisional Patent Application Ser. No. 61/418,501 filed on Dec. 1, 2010, which is incorporated herein for all purposes by this reference. This application and the Provisional patent application have at least one common inventor.

TECHNICAL FIELD

The invention relates to coupled inductor systems. More particularly, the invention relates to multiple coil systems for use in wireless data transfer applications. In preferred embodiments, the invention relates to the wireless transmission of data among coupled inductor coils. In preferred embodiments employed in wireless power transfer applications, the invention relates to the more efficient utilization of energy resources.

BACKGROUND OF THE INVENTION

Existing power transmission systems utilize coupled inductor coils to transfer power wirelessly. Some of the systems known in the art also transmit data as well as power. Typically such systems use high-inductance coils (on the order of micro-Henries) and switch at low frequencies (hundreds of kHz). These systems are somewhat effective for transmitting power for apparatus such as battery chargers, AC/DC converters, and remote devices, but are not capable of transmitting high-bandwidth data. Effective implementation of wireless data transmission systems using coupled inductors faces several challenges. Among them is the problem of tuning the elements of the system to optimize transmission frequency in the presence of parasitic elements that cause ringing or otherwise distort the data signal. Additional problems encountered include, managing the peak currents in the inductors, and reliably sending and receiving data in the presence of active inductive power transmission. Another significant challenge is maintaining maximum bandwidth in the presence of varying system conditions such as temperature, coil misalignment, and coil separation.

Due to these and other problems and potential problems, improved coupled inductor data and/or power transmission systems would be useful and advantageous contributions to the arts.

SUMMARY OF THE INVENTION

In carrying out the principles of the present invention, in accordance with preferred embodiments, the invention provides advances in the arts with novel apparatus directed to the transfer of data and/or power using inductive couplings. In preferred embodiments, systems include capabilities for data and/or power transfer. Preferably, the coupled coils of systems of the invention are not permanently physically interconnected.

According to aspects of the invention, examples of preferred embodiments include multiple coil systems having at least a primary coil, and a secondary coil for coupling with the primary coil. The primary and secondary coils are preferably not permanently physically affixed to one another and are interchangeable, e.g., a secondary coil can preferably be removed and replaced with a different secondary coil. When positioned in proximity, the primary and secondary coils are electromagnetically, but not physically, coupled such that one or more signals may be passed between the coils.

According to aspects of the invention, in examples of preferred embodiments, a multiple coil system for wireless data transmission includes multiple primary side coils connected such that they may be driven independently with a driver signal. One or more suitable secondary coils are positioned in proximity to the primary coils for receiving the signal inductively so that the signal may be wirelessly transferred from one or more of the primary coils to one or more secondary coil.

According to aspects of the invention, in examples of preferred embodiments, systems for wireless data transmission includes multiple primary coils connected with circuitry for sensing secondary coil proximity and for operating to responsively transmit a signal to detected secondary coils located in proximity with the primary coils.

According to aspects of the invention, preferred embodiments of a system for multiple coil wireless data transmission include at least one coil equipped with switchable taps that may be selected for changing the frequency characteristics of the coil.

According to another aspect of the invention, preferred embodiments of a system for multiple coil wireless data transmission include at least one coil connected with a switchable capacitor network that may be used for selectively changing the frequency characteristics of the coil.

According to an additional aspect of the invention, an example of a preferred multiple coil data transfer system according to the invention includes at least one primary coil connected to a circuit for transmitting data. A secondary coil is provided, along with a circuit for receiving data. In the system, at least one primary coil and at least one secondary coil are adapted for inductively coupling for data transfer. In order to facilitate this, the primary side includes circuitry for selecting at least one primary coil for transmitting data based on sensed proximity to a secondary coil.

The invention has advantages including but not limited to one or more of, improved coupled coil system bandwidth, improved data integrity, and reduced costs. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

Figure 1:
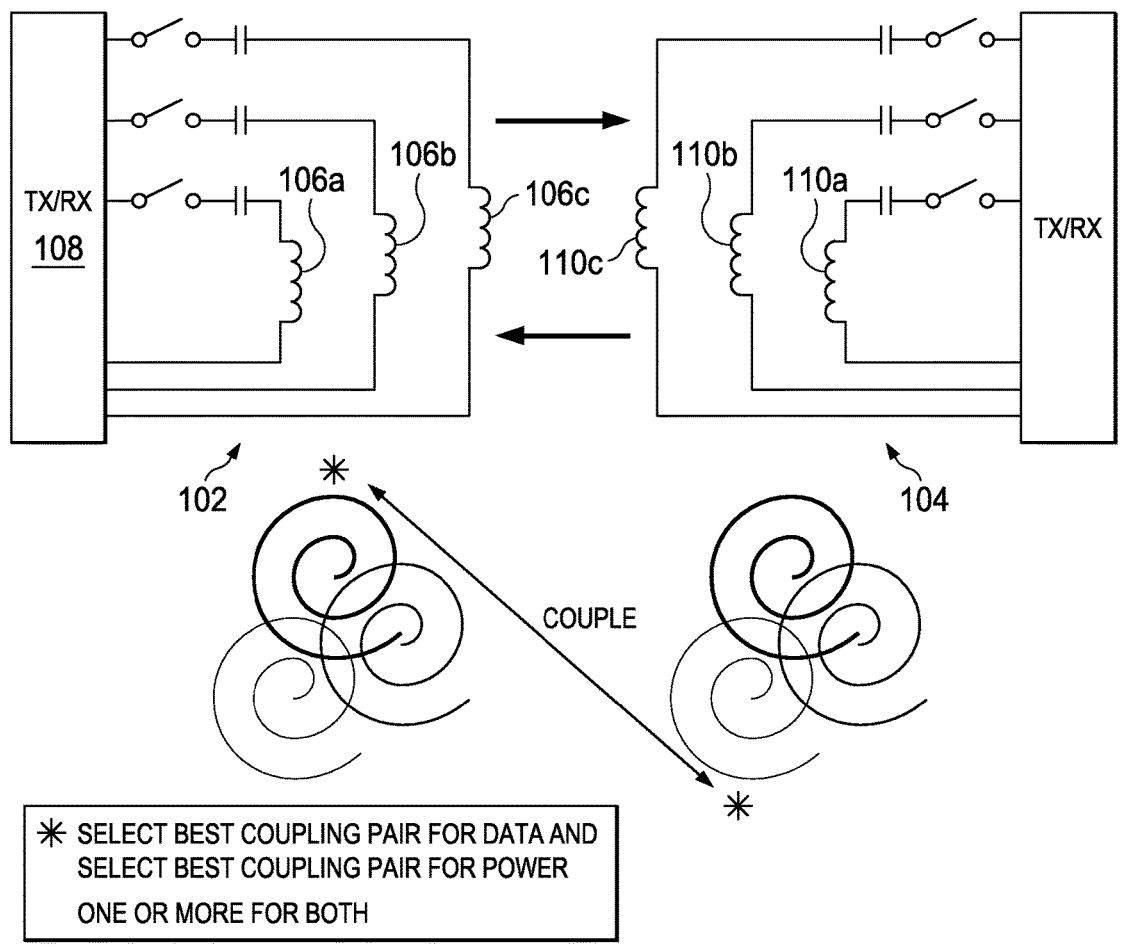
FIG. 1 is a simplified schematic diagram of a coupled inductor system illustrating an example of a preferred embodiment of the invention.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

The present patent application is related to U.S. patent application Ser. No. 13/045,493 which shares at least one common inventor with the present application and has a common assignee. Said related application is hereby incorporated herein for all purposes by this reference.

It has been determined that data may be transferred efficiently among coupled coils. Generally, using inductive coupling, a primary coil is positioned in proximity to a secondary coil. The primary and secondary coils are properly oriented and positioned so that they may be electromagnetically coupled in order to facilitate a transfer of energy between them. Generally, one primary coil is used with one secondary coil, and secondary side systems are designed to resonate at a particular frequency. This allows for more efficient transfer of energy at that particular frequency. The inventors have reduced to practice a novel and useful improved coupled inductor data transmission system using multiple inductor coils, on the order of 10's to 100's of nano-Henries, switched at high frequencies, on the order of 10's to 100's of MHz. The multiple coils of the system can be dynamically coupled based on operational considerations.

The systems of the invention can be utilized for high bandwidth wireless data transmission as well as for wireless power transmission. Preferably, the primary and secondary coils are not permanently physically connected with one another. Each of the coils is preferably connected with additional circuitry designed for particular functionality. For example, the primary coil may be associated with data signal transmitting circuitry, and the secondary coil may be associated with corresponding data receiving circuitry. The respective coils typically reside in electronic apparatus or systems of various kinds. For example, the primary coil may reside within a battery charger or power inverter apparatus, and the secondary coil may reside in communication, computer, battery, imaging, or other portable apparatus, to cite a few examples. The respective coils are positioned within their respective apparatus such that, in operation, they may be placed in physical proximity for inductive coupling such that the coils are in communication with one another for the exchange data, and in some cases power. The system drives the primary coil on one side to transmit, and receives at the secondary coil on the other side. Such systems can be utilized for high bandwidth communication as well as power transfer across the inductive coupling between the primary and secondary coils. Transmitter, receiver, or transceiver apparatus may be used as desired for the particular implementation, using available communications equipment in combination with the multiple coil data transmission system.

In the coupled inductor system according to the invention, a signal from a primary side driver is transmitted through a primary side coil to a secondary coil. If a data receiving circuit or load is connected to the secondary coil, the electric current from the secondary coil can be used to transmit data and/or to power the load. An example of a preferred embodiment of a coupled inductor system for wireless data transfer according to the invention is shown in FIG. 1. The system 100 includes a primary side 102 for providing one or more signals to a secondary side 104 receiver. The primary side 102 has multiple primary coils 106a, 106b, 106c, and driver circuitry 108. By using several primary coils 106 instead of a single coil, the size of each coil can be kept small and a large total area for inductive coupling can still be provided. The secondary side 104 has one, and preferably multiple coils 110a, 110b, 110c, for receiving signals from the primary side 102. In a system 100 with multiple primary coils 106, the primary coils preferably can be driven all simultaneously, one at a time, or in selected combinations. One or both sides (primary and secondary) of systems constructed in accordance with the invention can be built with multiple selectable coils.

In operation, with multiple coils arrayed in the system 100, as in this example using multiple primary side coils 106 and multiple secondary side coils 110, it is possible, using the primary side circuitry 108, to detect the presence and location of a secondary side coil 110 by using appropriate sensors arranged to sense changes in the current on the primary side coils 106. Proximity sensing preferably detects activity on a coil 106 by technology and techniques known in the arts. Activity on the coil 106 can be detected by rectifying the signal on the coil terminals and detecting the input power, for example. This detected power can be compared to a known threshold to determine whether the coil 106 is being driven by another coupled coil 110. Alternatively, the system 100 can be configured to sense the presence of a signal on the coil 106. Activity on the coil(s) 106 may be detected with or without first rectifying the signal. For example, coil activity can be sensed either from one terminal to ground or between the terminals. Upon detection of the position of a secondary side 104 receiving coil, e.g. 110(a), in proximity suitable for inductive coupling, then the appropriate transmitting coil or coils, e.g., 106(a), closest to and/or best aligned with the detected receiving coil 110(a) can be driven. In the event multiple transmitting coils can favorably be driven, each may be driven with a different drive strength selected to increase the overall the signal integrity in the system 100. It is within the scope of the invention to use the systems described and shown for transmitting power in addition to, or in some instances, instead of data.

Figure 2:
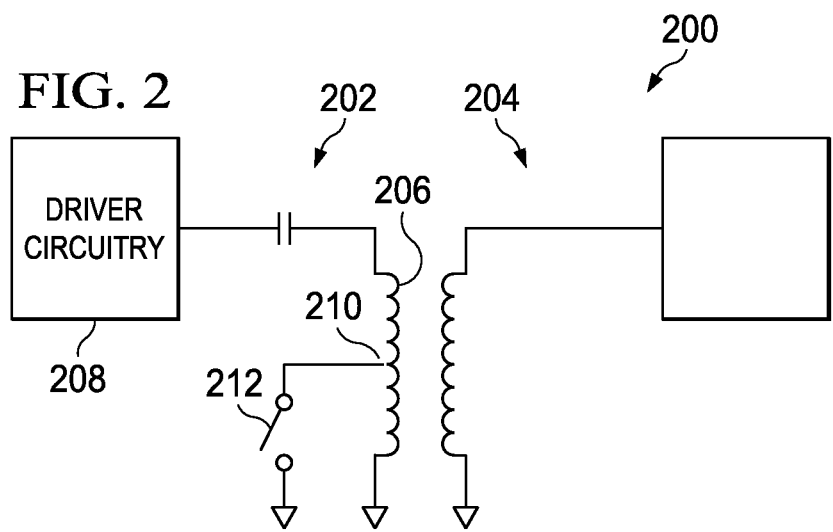
FIG. 2 is a schematic diagram of an example of a preferred embodiment of a multiple coil system according to the invention.

An example of a preferred embodiment of a coupled inductor system for wireless data transfer according to the invention is shown in FIG. 2. The system 200 includes a primary side 202 for providing one or more signals to a secondary side 204 receiver. The primary side 202 has driver circuitry 208 for driving one or more primary coil 206. The primary coil(s) 206 have one or more selectable tap points 210 activated by a switch 212 such that the effective size, and thus the frequency and resonance quality, or Q, of the primary coil(s) 206 can be changed dynamically. By manipulating the switch(es), e.g., 212 and changing the tap point 210, the radius of the coil 206 is changed based on a sense of the data integrity, coupling coefficient, or other system parameter detected by the primary side driver circuitry 208. This system 200 may be implemented using multiple coils 206 having one or more alternative tap points 210 such that various combinations may be selected dynamically according to operational requirements.

Figure 3:
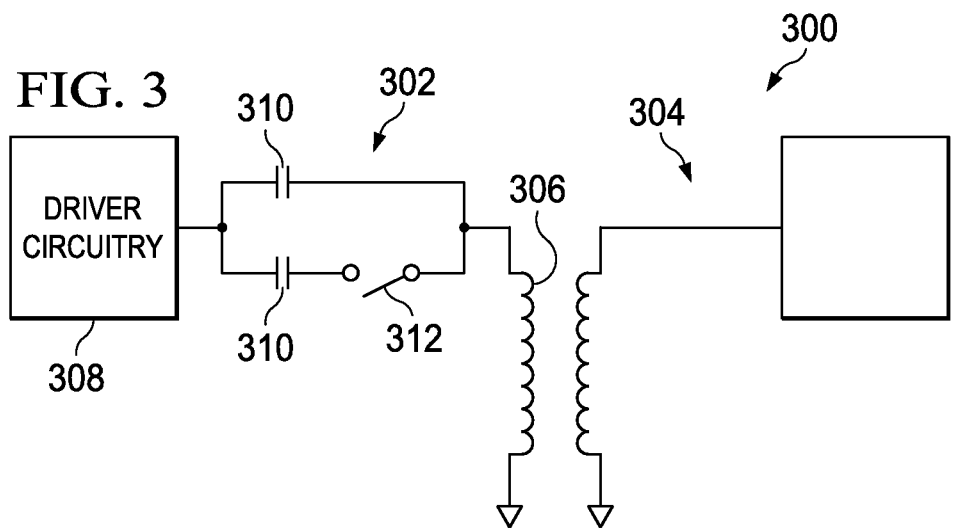
FIG. 3 is a simplified schematic view illustrating an example of a preferred embodiment of a multiple coil system according to the invention.

An additional example of another preferred embodiment of a multiple coil coupled inductor system for wireless power transfer according to the invention is shown in FIG. 3. The system 300 includes a primary side 302 for providing one or more signals to a secondary side 304 receiver. The primary side 302 has driver circuitry 308 for driving one or more primary coil 306. The primary coil(s) 306 are connected with a network 310 of one or more selectable capacitors which may be activated by switch(es), e.g., 312, such that the frequency and Q of the primary coil(s) 306 can be changed dynamically. By manipulating the switch(es), e.g., 312 and changing the effective configuration of the capacitor network 310, the resonant qualities of the coils may be changed based on a sense of the data integrity, coupling coefficient, or other system parameter detected by the primary side driver circuitry 308. This system 300 may be implemented using multiple coil(s) 306 having one or more alternative capacitor networks 310 for the dynamic implementation of combinations designed to match operational requirements. An additional feature of the invention includes the capability of driving two or more coils/resonant capacitors in parallel. Each coil/resonant capacitor setup can be used to provide a different filter frequency. This feature may be implemented on either, or both of, the primary side and the secondary side One or both sides (primary and secondary) of systems implementing the invention can be built with multiple coils, selectable taps or capacitor networks as shown in and described with respect to FIGS. 1 through 3, or suitable combinations thereof. The systems of the invention facilitate data transmission, and in some cases power transmission, using multiple coils in configurations through which the system can be adapted to changes in operating conditions, including the presence or absence of a secondary side, or misalignment of primary and secondary coils. Preferably, the systems of the invention have the capability of receiving both data and power on the same lines. This can be done simultaneously or serially. The system can change the transmission frequency when switching between power and data transmission. For example, the system can operate at the resonant frequency of the system for power transmission and change to a different frequency for data transmission. In a system with power and data both present, either the power or the data signal may be used for mode selection, configuration, and/or proximity sensing. When both data and power are transmitted through separate coils of a system, the physical locations of the data and power coils relative to each other can be critical. The relative positions of the coils coupled for transmission of data and power can be changed by selecting coils, and/or taps, and/or capacitor networks as described herein. General advantages may be realized by increasing or decreasing inductive coupling between transmitter and receiver, improving data integrity, or aiding in alignment of transmitting and receiving coils.

Physical proximity sensing by monitoring the current behavior on the primary coil(s) may be used to optimize overall system behavior. For example, the system can be put into an ultra-low power mode when there is no detection of a secondary coil in suitable proximity suitable for signal transfer. When the system detects the proximity of a secondary coil, then the system can enter into a more active mode such as a signal transfer mode. The system configuration and/or operation can also be changed based on the proximity of one or more secondary coil. For example, if the system uses a periodic ping to search for a receiver, then the ping frequency can be increased when proximity is detected. In some applications this will reduce the time required for the system to come up and complete configuration.

There are advantages to utilizing inductive multiple coil data and power transmission simultaneously. In a system which transmits both power and data, the power loop can be regulated using communication through the inductive data path. This path has higher bandwidth than other communication techniques such as modulating the power signal. Providing a high speed data path also enables additional functionality. Using the high speed data path for power control permits higher bandwidth and faster response times. Since the coupled coils are physically separated, they can be used to transmit data across an isolation barrier. This can be implemented in several different physical configurations. For example, the primary and secondary coils may be stacked vertically with an isolation barrier between them. The coils may be co-planar, either interleaved or not interleaved. In any implementation, the transmitting and receiving circuitry may be implemented separately or monolithically on a single piece of silicon. Using coils for data transmission is inherently a localized field communication. Consequently, this technology can be used for a variety of secure data transfer needs. These secure data transfer needs include, but are not limited to, payment transactions, personal identification, access control, asset tracking and management, transportation and logistics, animal identification, and inventory systems.

While the making and using of various exemplary embodiments of the invention are discussed herein, it should be appreciated that the present invention provides inventive concepts which can be embodied in a wide variety of specific contexts. It should be understood that the multiple coil system of invention may be practiced with coupled inductor systems having communications and power transfer functionality, such as in battery chargers, power converters, portable electronics, and the like. For purposes of clarity, detailed descriptions of functions, components, and systems familiar to those skilled in the applicable arts are not included. The methods and apparatus of the invention provide one or more advantages including but not limited to, data transfer capabilities, managed power transfer capabilities, and enhanced energy utilization and conservation attributes. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A system for wireless data transmission comprising:
a plurality of primary coils operably coupled to be driven independently with a signal;
a plurality of secondary coils positioned in proximity to the primary coils and suitable for receiving the signal inductively; and
a first driver circuit configured to inductively transfer a serial sequence of data and a second driver circuit configured to transfer power from one or more primary coil to one or more secondary coil by switching between a resonant frequency for power transmission and a different frequency for data transmission;
wherein at least one first primary coil can be operably coupled to the first driver circuit to drive the first primary coil with the serial sequence of data and at least one second primary coil can be operably coupled to the second driver circuit to drive the second primary coil with a power transmission signal.

2. The system for wireless data transmission according to claim 1 wherein the plurality of primary coils are operably coupled with circuitry for sensing secondary coil proximity and for responsively and selectively transmitting a signal to one or more of the detected secondary coils.

3. The system for wireless data transmission according to claim 1 wherein each secondary coil is selectively coupled with data receiving circuitry.

4. The system for wireless data transmission according to claim 1 wherein each secondary coil is selectively coupled with power receiving circuitry or data receiving circuitry.

5. The system for wireless data transmission according to claim 1 wherein at least one coil further comprises one or more switchable taps selectable for changing the frequency characteristics of the coil from a first configuration for power transfer to a second position for data transfer.

6. The system for wireless data transmission according to claim 1 wherein at least one coil is operably coupled to one or more switchable capacitor network selectable for changing the frequency characteristics of the coil from a first position for power transfer to a second position for data transfer.

7. A multiple coil data transfer system comprising:
at least one primary coil of a plurality of primary coils operably coupled to a circuit for transmitting data;
at least one secondary coil of a plurality of secondary coils operably coupled to a circuit for receiving data;
wherein at least one of the primary coils and at least one of the secondary coils are adapted for inductively coupling for data transfer;
primary side circuitry configured for selecting at least one primary coil of the plurality of primary coils for transmitting data to at least one of the secondary coils and at least one primary coil of the plurality of primary coils for transmitting power; and
wherein at least one primary coil can be operably coupled to a first driver circuit adapted for driving the primary coil with a data signal and at least one primary coil can be operably coupled to a second driver circuit adapted for driving the primary coil with a power transmission signal.

8. The multiple coil data transfer system according to claim 7 wherein a plurality of primary coils are operably coupled with circuitry for sensing secondary coil proximity and for responsively transmitting a signal to detected secondary coils.

9. The multiple coil data transfer system according to claim 7 wherein at least one secondary coil is operably coupled with data receiving circuitry.

10. The multiple coil data transfer system according to claim 7 wherein at least one secondary coil is operably coupled with power receiving circuitry.

11. The multiple coil data transfer system according to claim 7 wherein at least one coil further comprises one or more switchable taps selectable for changing the frequency characteristics of the coil.

12. The multiple coil data transfer system according to claim 7 wherein at least one coil is operably coupled to one or more switchable capacitor network selectable for changing the frequency characteristics of the coil.

13. A multiple coil data transfer system comprising:
at least one primary coil of a plurality of primary coils operably coupled to a circuit for transmitting data;
at least one secondary coil of a plurality of secondary coils operably coupled to a circuit for receiving data;
wherein at least one of the primary coils is dynamically configurable for operation at selectable frequencies for transmitting the data to one or more of the secondary coils and a second primary coil is dynamically configurable for transmitting power; and
wherein at least one primary coil can be operably coupled to a first driver circuit adapted for driving the primary coil with a power transmission signal and at least one second primary coil can be operably coupled to a second driver circuit to drive the second primary coil with the data.

14. The multiple coil data transfer system according to claim 13 wherein at least one secondary coil is operably coupled with power receiving circuitry.

15. The multiple coil data transfer system according to claim 13 wherein at least one coil further comprises one or more switchable taps selectable for changing the frequency characteristics of the coil.

16. The multiple coil data transfer system according to claim 13 wherein at least one coil is operably coupled to one or more switchable capacitor network selectable for changing the frequency characteristics of the coil.

17. The multiple coil data transfer system according to claim 13 wherein at least one of the primary coils is operably coupled with circuitry adapted for sensing secondary coil proximity and for selecting at least one of the primary coils for transmitting data based on sensed proximity to at least one of the secondary coils.

18. The multiple coil data transfer system according to claim 7 wherein the primary side circuitry is configured for selecting at least one primary coil of the plurality of primary coils for transmitting data based on sensed proximity to at least one of the secondary coils.

19. The multiple coil data transfer system according to claim 13 wherein the second primary coil is dynamically configurable at a selectable resonant frequency for transmitting power.

20. The multiple coil data transfer system according to claim 7 wherein the data is a serial sequence of data.

* * * * *